US012320192B2

(12) United States Patent
Barioli et al.

(10) Patent No.: US 12,320,192 B2
(45) Date of Patent: Jun. 3, 2025

(54) TORSION SPRING ADJUSTER

(71) Applicant: EASTERN METAL SUPPLY INC., Lake Worth, FL (US)

(72) Inventors: Raffaele Barioli, Lake Worth, FL (US); Bill Feeley, Lake Worth, FL (US); Chris Miller, Lake Worth, FL (US); Brian Peterson, Lake Worth, FL (US)

(73) Assignee: EASTERN METAL SUPPLY, INC., Lake Worth, FL (US)

( * ) Notice: Subject to any disclaimer, the term of this patent is extended or adjusted under 35 U.S.C. 154(b) by 357 days.

(21) Appl. No.: 16/939,285

(22) Filed: Jul. 27, 2020

(65) Prior Publication Data

US 2022/0025699 A1   Jan. 27, 2022

(51) Int. Cl.
*E06B 9/17* (2006.01)
*E06B 9/15* (2006.01)
*F16F 1/16* (2006.01)
*E06B 9/60* (2006.01)

(52) U.S. Cl.
CPC ............. *E06B 9/17* (2013.01); *E06B 9/15* (2013.01); *F16F 1/16* (2013.01); *E06B 9/60* (2013.01); *F16F 2228/08* (2013.01); *F16F 2230/0005* (2013.01); *F16F 2236/085* (2013.01)

(58) Field of Classification Search
CPC .. F16F 1/14; F16F 2228/08; F16F 2230/0005; F16F 2236/085; E06B 9/17; E06B 9/15; E06B 9/08; E06B 9/56; E06B 9/60; E06B 9/62; E06B 9/174; E06B 9/17007; E06B 9/50; E06B 9/42; E06B 9/322; E06B 9/80; E06B 9/40; E06B 9/11

USPC .................................................. 267/154, 157
See application file for complete search history.

(56) References Cited

U.S. PATENT DOCUMENTS

| | | | | |
|---|---|---|---|---|
| 4,253,350 | A * | 3/1981 | De Tarr | B25B 25/00 81/62 |
| 4,323,105 | A * | 4/1982 | Berman | E06B 9/60 160/319 |
| 4,817,927 | A * | 4/1989 | Martin | E05D 13/1261 267/155 |
| 5,605,079 | A * | 2/1997 | Way | B25B 27/30 81/61 |

(Continued)

FOREIGN PATENT DOCUMENTS

| | | | |
|---|---|---|---|
| AU | 2019100851 A4 * | 9/2019 | |
| CN | 114059908 A * | 2/2022 | |
| NL | 2026501 B1 * | 5/2022 | |

*Primary Examiner* — Daniel P Cahn
*Assistant Examiner* — Matthew R. Shepherd
(74) *Attorney, Agent, or Firm* — GREENBLUM & BERNSTEIN, P.L.C.

(57) ABSTRACT

A torsion spring adjuster for a rolling shutter is provided. A support plate has a first flange with a hole. A wheel is rotatably mountable on the support plate. The wheel has: a drive recess shaped to engage an end of a torsion spring; a first set of recesses around a circumference of the wheel, the first set of recesses being a first lateral distance from a first end of the wheel; a second set of recesses around a circumference of the wheel, the second set of recesses being a second lateral distance from the first end of the wheel. When the wheel is mounted on the support plate the first lateral distance aligns the first set of recesses with the hole of the first flange of the support plate, and the second lateral distance aligns the second set of recess past the first flange of the support plate.

5 Claims, 8 Drawing Sheets

(56) References Cited

U.S. PATENT DOCUMENTS

| | | | | |
|---|---|---|---|---|
| 6,155,327 | A * | 12/2000 | Wells | E06B 9/60 160/198 |
| 6,263,541 | B1 * | 7/2001 | Scates | E05D 13/1261 16/197 |
| 6,735,905 | B1 * | 5/2004 | Miller | E05D 13/1261 160/315 |
| 9,243,447 | B2 * | 1/2016 | MacDonald | E06B 9/68 |
| 10,364,602 | B2 * | 7/2019 | Kwak | E06B 9/60 |
| 11,021,909 | B2 * | 6/2021 | Lai | E06B 9/60 |
| 2003/0094248 | A1 * | 5/2003 | Mitchell | E05D 13/1261 160/191 |
| 2004/0020609 | A1 * | 2/2004 | Savard | E06B 9/174 160/133 |
| 2005/0011620 | A1 * | 1/2005 | Crouch | E06B 9/60 160/315 |
| 2005/0087642 | A1 * | 4/2005 | Dalle Nogare | E06B 9/90 242/385.1 |
| 2005/0150615 | A1 * | 7/2005 | Bousson | E06B 9/60 160/313 |
| 2006/0162876 | A1 * | 7/2006 | Kwak | E06B 9/42 160/296 |
| 2007/0012410 | A1 * | 1/2007 | Savard | B25B 13/46 160/315 |
| 2007/0193701 | A1 * | 8/2007 | Petrick | E06B 9/15 160/133 |
| 2020/0087963 | A1 * | 3/2020 | Schumacher | E06B 9/62 |
| 2020/0157883 | A1 * | 5/2020 | Ng | E06B 9/60 |

* cited by examiner

TORSION SPRING ADJUSTER

FIELD OF THE INVENTION

Various embodiments described herein relate generally to a torsion spring adjuster. More specifically, various embodiments herein relate to a torsion spring adjuster for use in a rolling shutter system.

BACKGROUND

Torsion springs are coil springs that store and release mechanical energy. Unlike a traditional coil spring that stores energy by pulling the ends apart, a torsion spring stores energy by twisting one end relative to the other. One of the most basic examples of a torsion spring is that found in a mousetrap.

Shutters are used for decoration, security, and weather protection. Recent powerful hurricanes in the southeastern United States have raised building protection as a serious issue. Shutters are often used in these and other regions to provide protection during hurricanes and other strong storms. Shutters provide light and air during a storm, while protecting the building and the occupants from airborne objects. Many coastal portions of the United States require that homes and businesses have metal storm shutters over windows to protect the interior of the buildings during extreme weather which is common to this part of the country.

There are various different types of metal shutters on the market. Rolling storm and security shutters are well known in the art. Such shutters cover windows, doors and other portal openings for protection against elements or intruders. Systems typically comprise a shutter assembly of interlocking slats disposed between a pair of guide tracks attached to opposite sides of the portal opening with a top most slat connected to a reel tube. The slats collectively form a curtain that can be wound around the reel tube into a retracted/open state when the portal is to be open, and thus unwound so the slats freely slide along the guide tracks to a deployed/closed position when the portal is closed. In the closed position, the guide tracks further serve to hold the shutter assembly in place to reduce unwanted lateral movement due to displacement forces applied by burglars or the elements.

An example of a torsion spring 1000 for use in a rotating shutter system is shown in FIG. 10. Torsion spring 1000 has left and right sides, and the overall length is typically less than the reel tube that it supports. The main component of torsion spring 1000 is a coil spring 1002 that extends almost along the full length of torsion spring 1000. A shaft 1004 with drive ends (e.g., square ends) extends through the coil spring 1002. The reel tube 1006 is hollow and contains a non-circular shape, typically an octagon. The torsion spring 1000 extends into the hollow interior of the reel tube 1006.

On the right end of the torsion spring, an interface component (not shown) connects the right end of the coil spring 1002 to the right end of the shaft 1004, such that rotation of the shaft 1004 rotates the right end of the coil spring 1002. A frame 1008 has an interior hole to receive and support the right end of shaft 1004, and an exterior periphery that matches the hollow interior shape of the reel tube 1006 (e.g., an octagon). Frame 1008 and shaft 1004 are not connected, such that frame 1008 does not rotate in response to rotation of shaft 1004.

On the left end of the torsion spring 1000, a frame 1010 has an interior hole to receive and support the left end of shaft 1004, and an exterior periphery that matches the hollow interior shape of the reel tube (e.g., an octagon). Frame 1010 and shaft 1004 are not connected, such that frame 1010 does not rotate in response to rotation of shaft 1004. The left end of coil spring 1002 is connected to frame 1010.

When the curtain 1012 is pulled down from its retracted position, the coil spring 1002 is wound to build up mechanical energy. Specifically, the shaft 1004 does not rotate with the reel tube 1006, frames 1008 or 1010, and thus the right end of coil spring 1002 does not rotate due it is fixed connection with shaft 1004. The left end of coil spring 1002 rotates with the frame 1010. The coil spring 1002 winds by the fact that one end is rotating while the other end is fixed. When the curtain 1012 is later lifted to move from the deployed position to the retracted position, coil spring 1002 unwinds and the mechanical energy pulls the curtain 1012 upwards.

The torsion spring 1000 may need to be adjusted to provide the appropriate amount of lift for the curtain 1012. If the torsion spring 1000 is too weak, it needs to be tightened (rotating the coil to extend its length) else it will not provide enough lift. If the torsion spring 1000 is too strong it needs to be loosened (rotating the coil to reduce its length) else it will move the curtain too quickly. The strength of torsion spring 1000 can be adjusted by rotating the shaft 1004. Rotation of shaft 1004 rotates the right end of coil spring 1002 while the left end of coil spring 1002 remains fixed due to its attachment to frame 1010 that is held in place by reel tube 1006.

A problem with torsion spring 1000 in this environment is the manner of adjustment. The most common method is turning the shaft with bare hands. The force required to adjust a torsion spring by hand are considerable, and if there is an accident during manual adjustment individuals can suffer broken bones or torn ligaments.

The garage door art has a similar problem as it uses a torsion spring to assist in raising and lowering a garage door. Such garage door torsion springs are adjusted with a winding cone 902 such as shown in FIGS. 9A and 9B. A winding cone 902 is mounted on the end of the torsion spring 904. The winding cone has a series of holes around its periphery at common lateral distance from the end of the winding cone 902. Some of the holes are shaped to receive bolts 906, and other holes 910 are shaped to receive winding bars 908a and 908b. To adjust the spring tension, a winding bar 908a is inserted into one of the empty holes 910, and the bolts 906 are loosened. The user holds the bar 908a to prevent the spring from recoiling to its natural rest state, and if the user loses their grip the bar 908a would act as a stopper when it rotates into contact with the wall. The user then adjusts the torsion spring 904 by moving the bar 908a to rotate the winding cone 902 and one end of the attached torsion spring 904. Since the other end of torsion spring 904 is fixed to a wall bracket 912, rotating the end of torsion spring 904 either expands or contracts torsion spring 904, thereby changing the amount of lift that torsion spring 904 provides to raise and lower the garage door.

The range of rotation is limited by how far bar 908a can rotate before it hits the wall. Once the bar 908a cannot rotate any further to the wall, the user inserts bar 908b into another hole 910, removes the bar 908a, and continues rotation with bar 908b. When bar 908b rotates as far as needed, the user inserts bar 908a into another hole, removes the bar 908b, and continues rotation with bar 908a. This process continues iteratively in rotational increments of 60-120 degrees until the torsion spring 904 reaches the desired tension. The user then tightens the bolts 906 to hold the tension and removes the bars 908a/b.

The garage door winding cone 902 does not adapt to a commercial rolling shutter system as the components simply do not interface with each other. Attempts have been made to develop other types of torsion spring adjusters for the rolling shutter market, but none have proven commercial viable. The most common method remains manual manipulation of the spring by hand with the corresponding risk of considerable injury.

DRAWINGS

Various embodiments in accordance with the present disclosure will be described with reference to the drawings, in which:

FIGS. 9A and 8B show prior art garage doors with winding cones.

Figure 1:
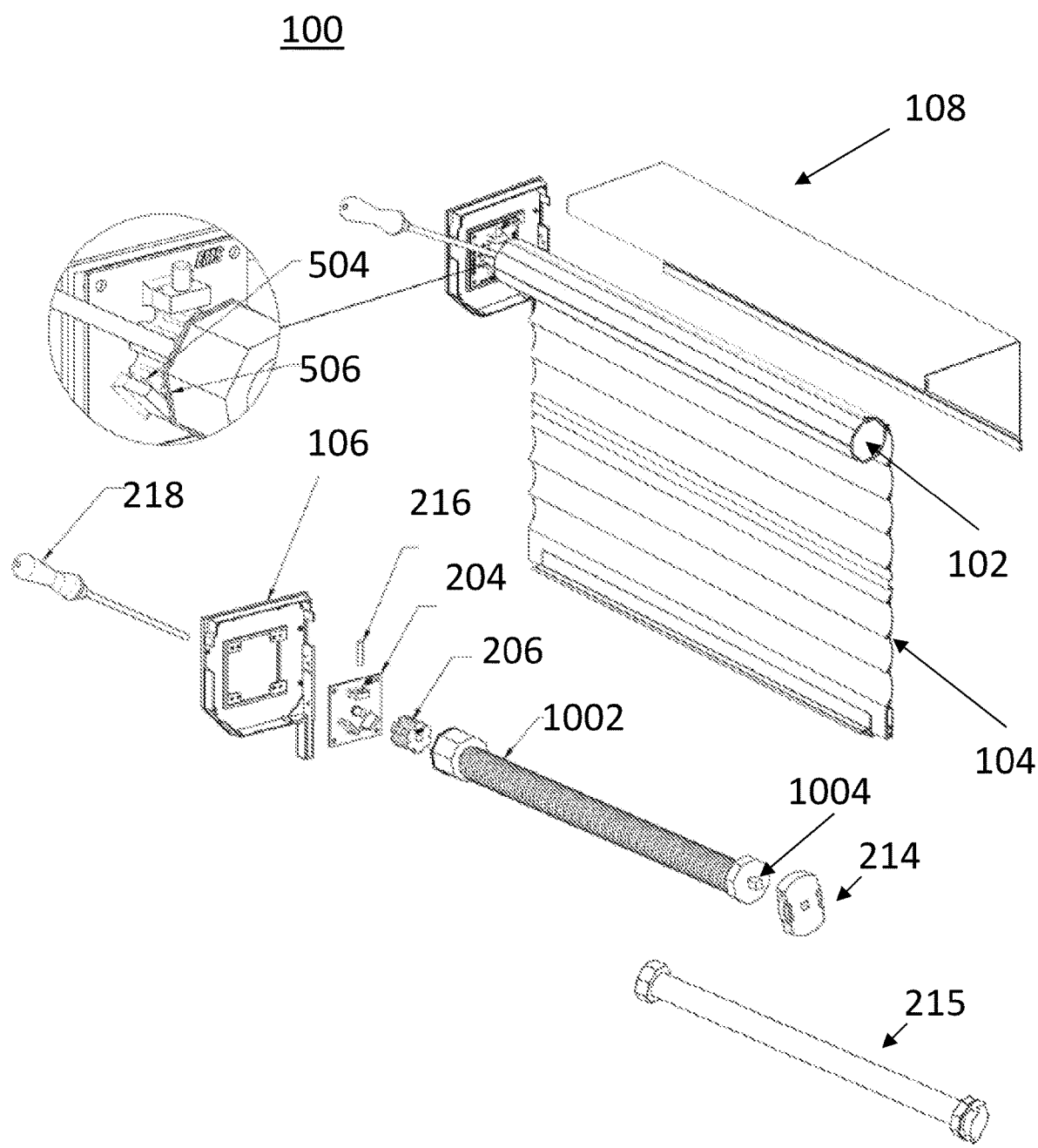
FIG. 1 shows an exploded view of an embodiment of the invention.

All drawings are to scale unless noted otherwise.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

References to one or an embodiment in the present disclosure can be, but not necessarily are, references to the same embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various features are described which may be features for some embodiments but not other embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Several definitions that apply throughout this disclosure will now be presented. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized means "including, but not necessarily limited to"; it specifically indicates open-ended inclusion or membership in the so-described combination, group, series and the like. The term "a" means "one or more" unless the context clearly indicates a single element. The term "about" when used in connection with a numerical value means a variation consistent with the range of error in equipment used to measure the values, for which ±5% may be expected. "First," "second," etc., re labels to distinguish components or blocks of otherwise similar names, but does not imply any sequence or numerical limitation. When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

As used herein, the term "front", "rear", "left," "right," "top" and "bottom" or other terms of direction, orientation, and/or relative position are used for explanation and convenience to refer to certain features of this disclosure. However, these terms are not absolute, and should not be construed as limiting this disclosure. For purposes of discussion, as shown in FIG. 1 the dimension of "length" (L) shall be between the left and right sides of the shutter, the dimension of "width" (W) shall be between the front and back of the shutter, and the dimension of "height" (H) shall be between the top and bottom of the shutter.

Shapes as described herein are not considered absolute. As is known in the art, surfaces often have waves, protrusions, holes, recesses, etc. to provide rigidity, strength and functionality. All recitations of shape (e.g., cylindrical)

herein are to be considered modified by "substantially" regardless of whether expressly stated in the disclosure or claims, and specifically accounts for variations in the art as noted above.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring example embodiments.

It is an object of some embodiments herein to provide a torsion spring adjuster to adjust the strength of the torsions spring. The disclosed environment may be a rolling storm shutter, but the invention is not so limited and can be used in other environments that use torsions springs.

Figure 10:
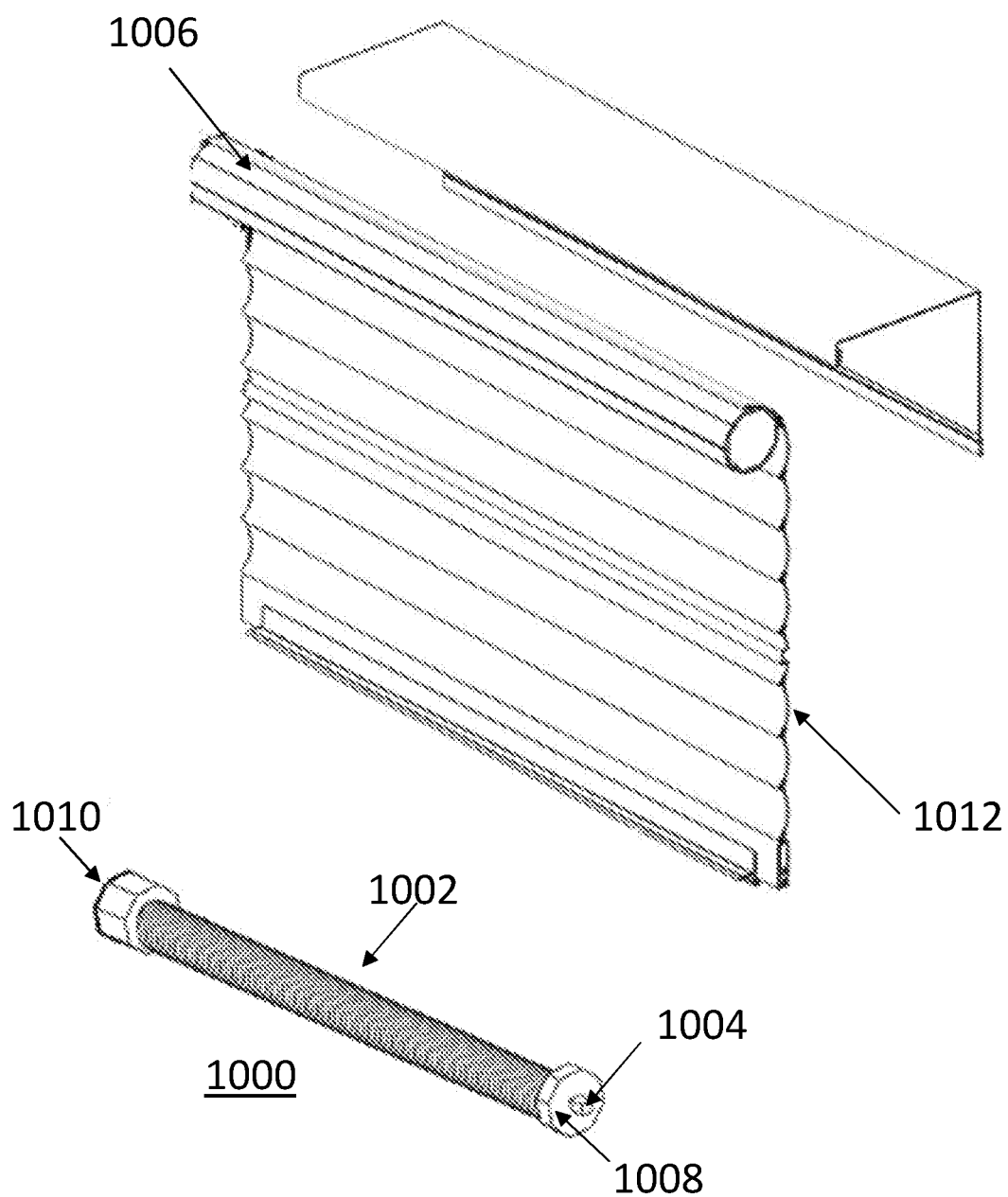
FIG. 10 show a prior art rolling shutter system.

Referring now to FIG. 1, a rolling shutter assembly 100 is shown. A reel tube 102 supports a series of connected slats 104 that defines a curtain. The reel tube 102 is mounted on end caps 106, only one of which is shown in FIG. 1, and for which the other end cap is of a design as is known in the art. A top cover 108 extends between the end caps and covers the reel tube 102 and connected slats 104. FIG. 1 shows the shutter assembly in an unwound state. Reel tube 102 has a hollow octagon shaped interior to accommodate the drive components and torsion spring 1000 (which as show is the prior art design from FIG. 10, although the invention is not so limited). In FIG. 1 the length of the shutter system is similar to that of torsion spring 1000, although components are cut to length and typically will be longer than torsion spring 1000. Also torsion spring 1000 is shown in its entirety FIGS. 1 and 3, yet shown only as a tube in other figures (lacking coil spring 1002 and end frames 1008 and 1010) for ease of understanding.

Figure 2:
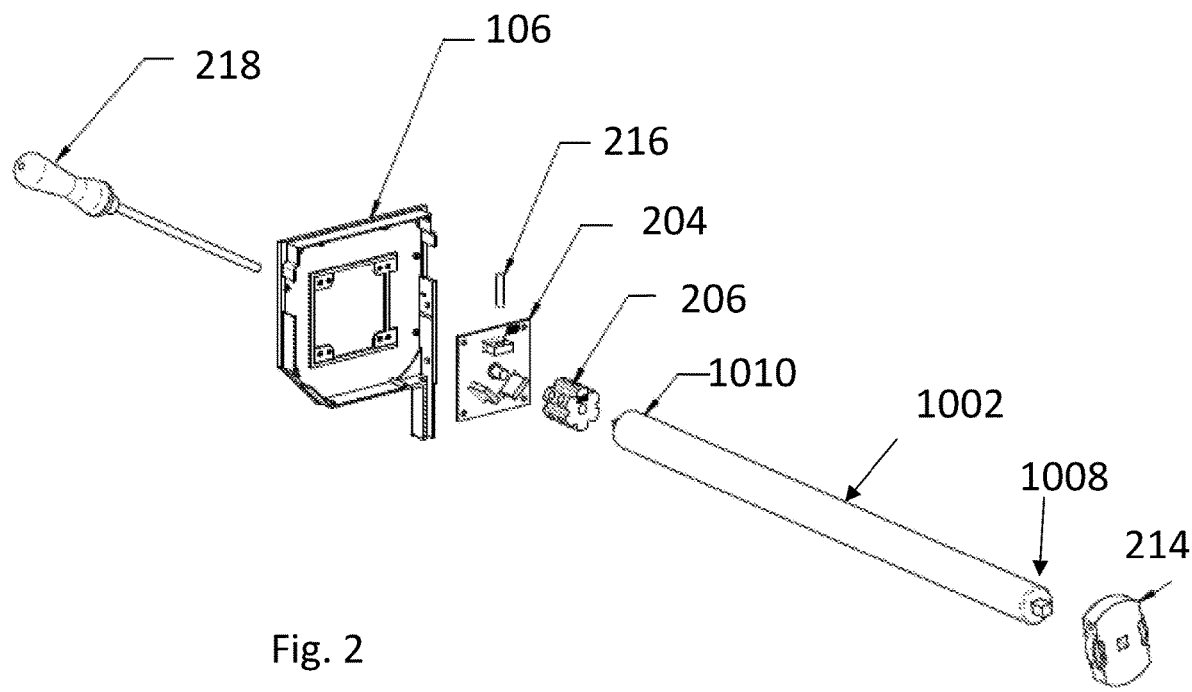
FIG. 2 shows an exploded view of drive components of the embodiment of FIG. 1.
Figure 3:
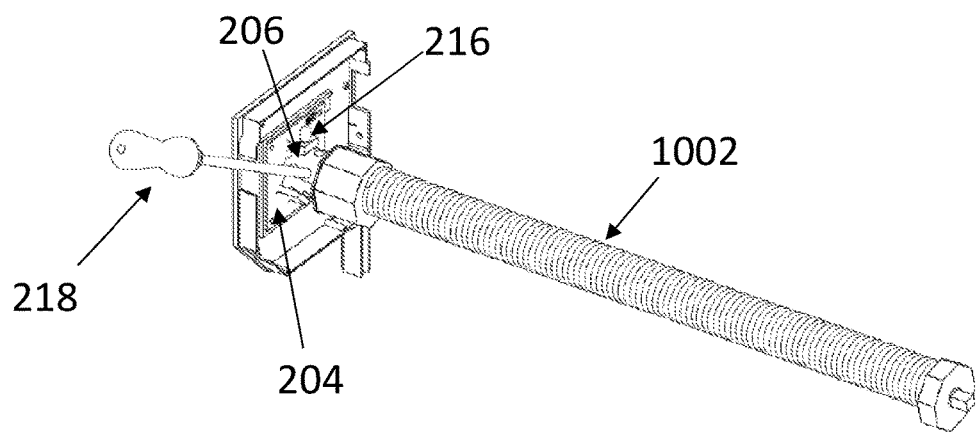
FIG. 3 shows an embodiment of the assembled state of FIG. 2.

Referring now to FIGS. 2 and 3, drive components of shutter assembly 100 that insert into reel tube 102 are shown. FIG. 2 shows the components in an exploded state, and FIG. 3 shows the components in an assembled state.

Figure 4:
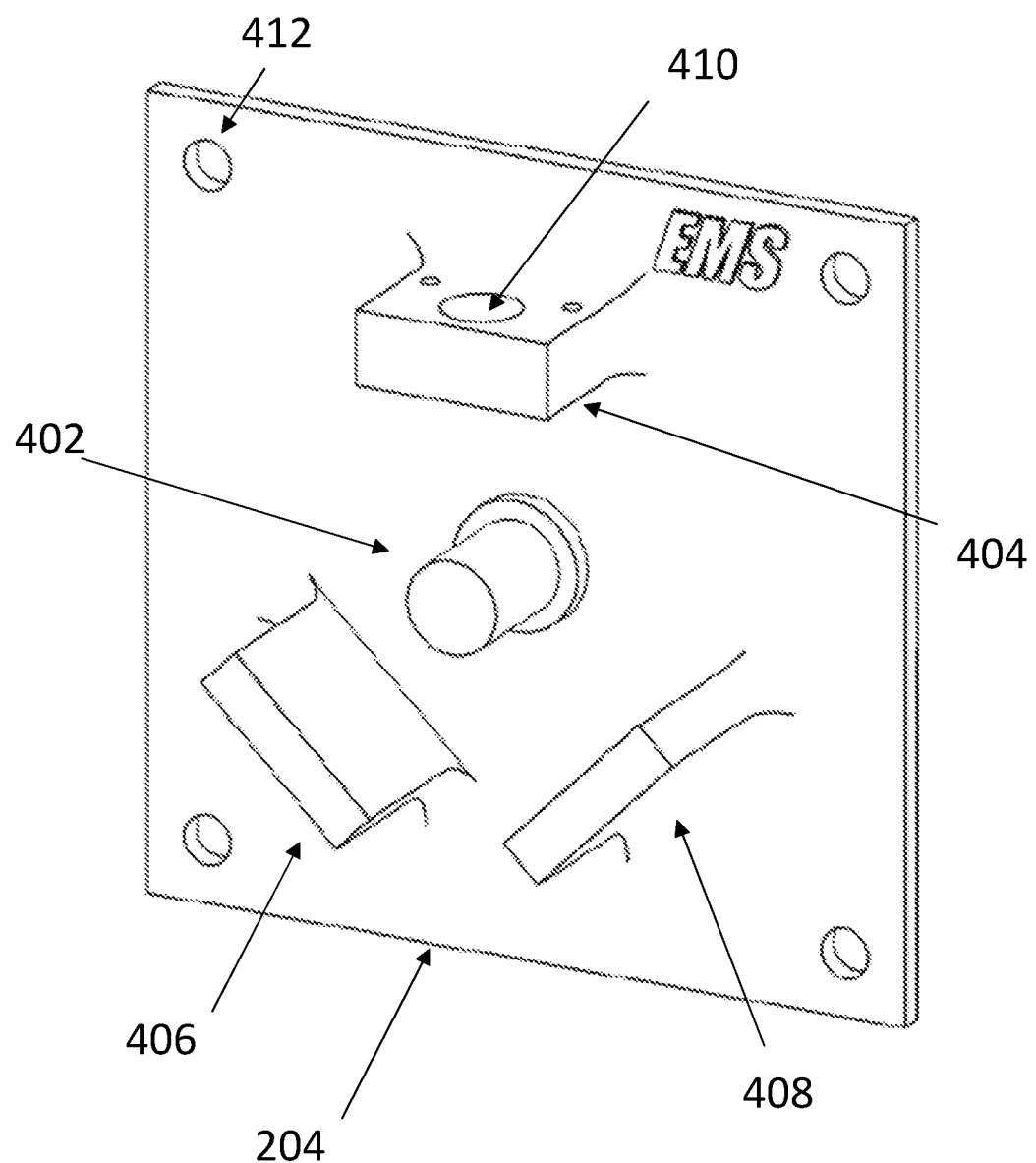
FIG. 4 shows a perspective view of a support plate of the embodiment of FIG. 1.

Referring now also to FIG. 4, a support plate 204 is mounted on end cap 106. Support plate 204 has a cylindrical axle 402 projecting therefrom. As discussed in more detail below, wheel 206 is rotatably mounted on axle 402. Three flanges 404, 406, and 408 surround axle 402. The topmost flange 404 includes a locking pin hole 410. As discussed in more detail below, locking pin hole 410 can receive locking pin 216. Mounting holes 412 are positioned about support plate 204 for mounting support plate 204 onto end cap 106 with screws or the like.

Figure 5:
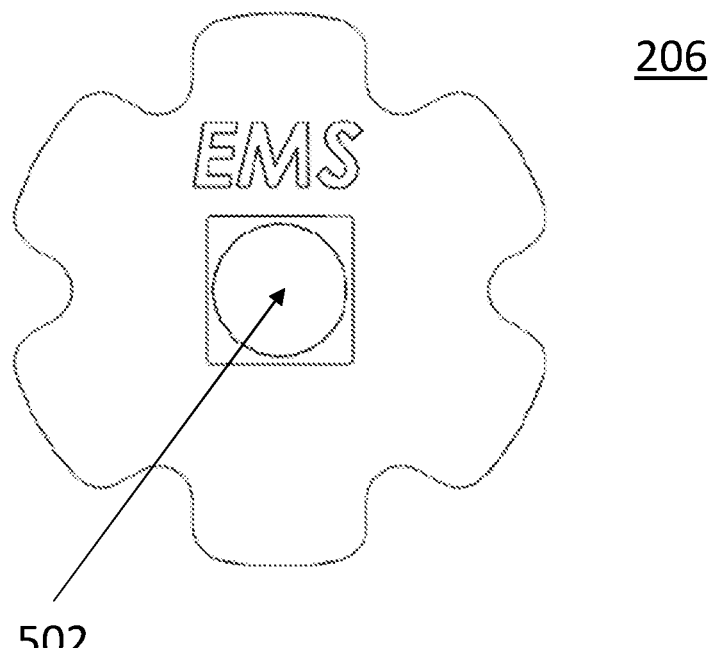
FIGS. 5-6 show front and rear perspective views of a wheel according to the embodiment of FIG. 1.
Figure 6:
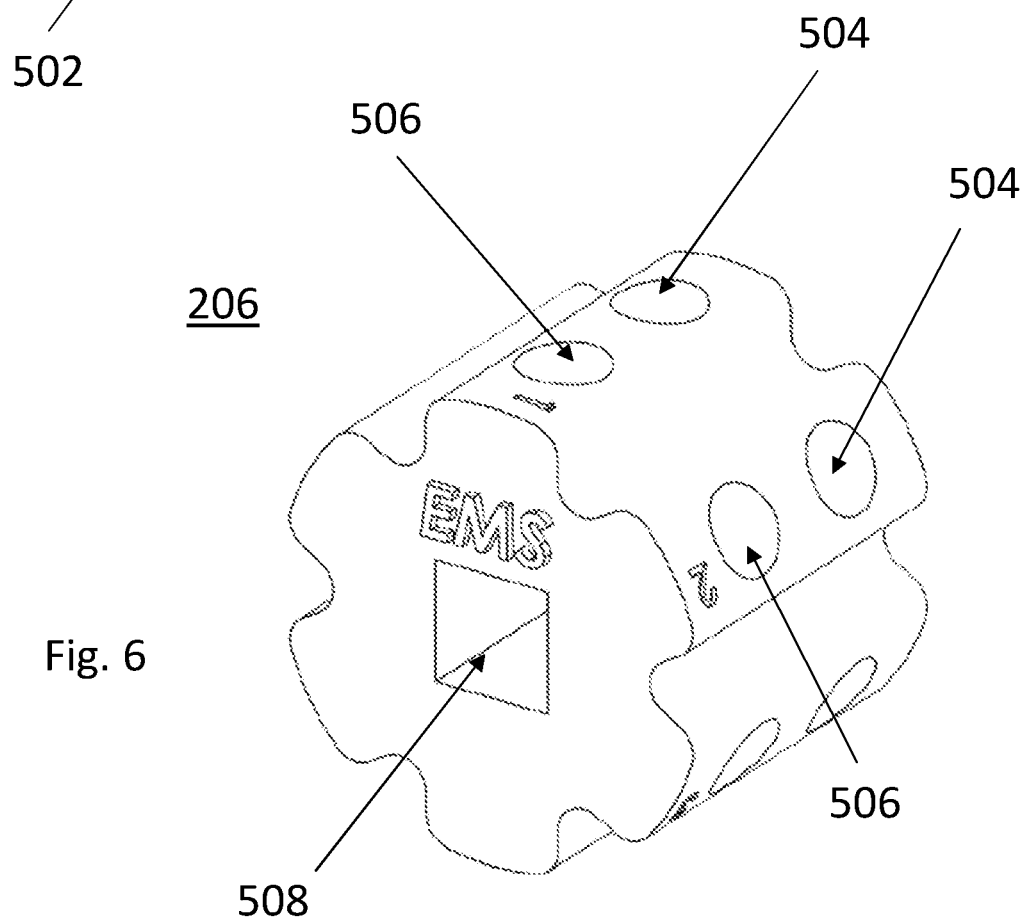
Figure 7:
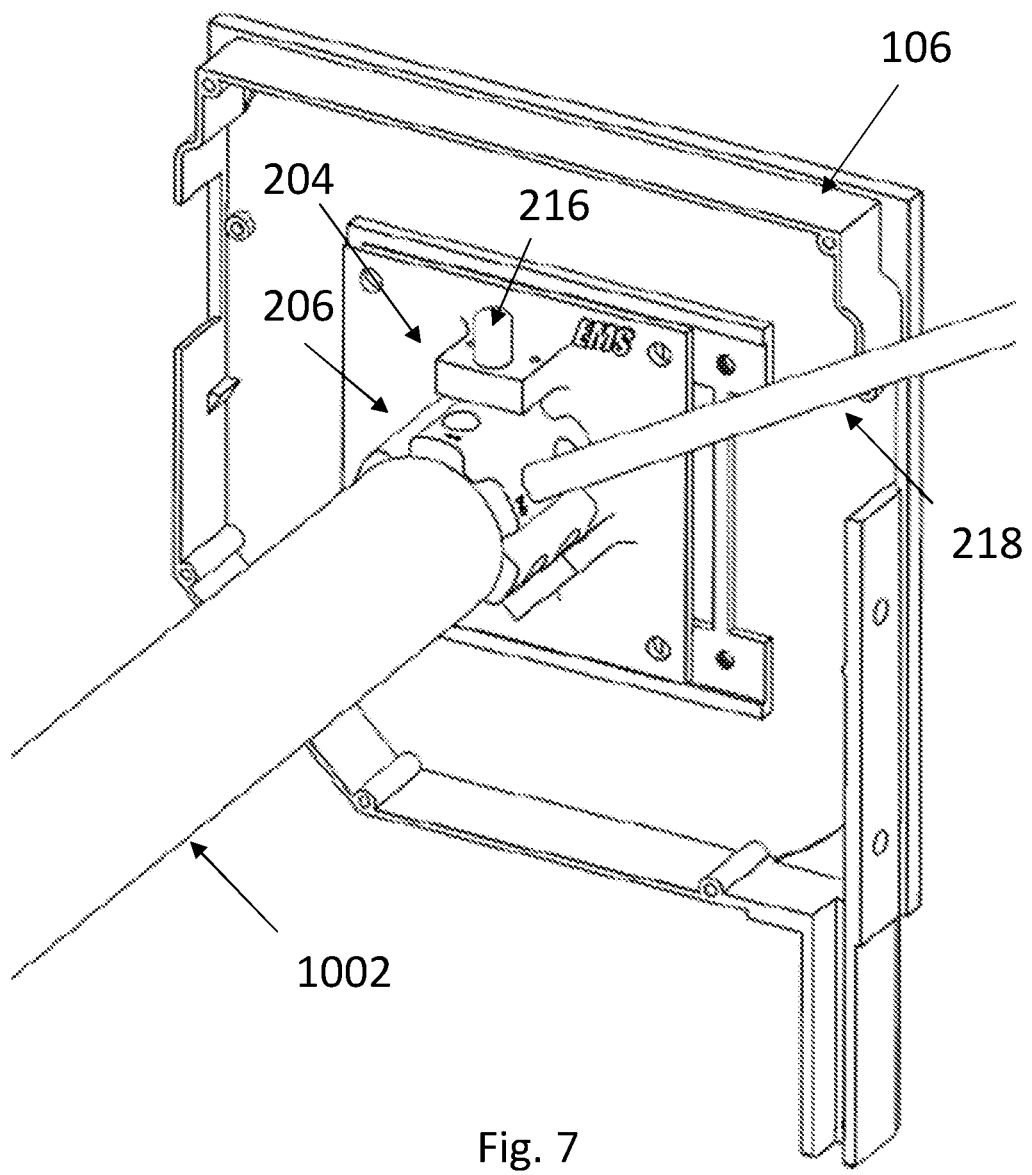
FIG. 7 shows a close up perspective view of several drive components of the embodiment of FIG. 1.

Referring now also to FIGS. 5-7, adjusting wheel 206 is shown in more detail. Adjusting wheel 206 has a central axis, and on one end has a cylindrical recess 502 for receiving axle 402 of support plate 204 to allow wheel 206 to freely rotate when not locked in place. Wheel 206 on its opposing end has a non-circular recess 508 for engaging the left end of shaft 1004 that runs through torsion spring 1000.

Wheel 206 has a set of locking pin recesses 504 around its circumference, all at a common lateral distance from the end of wheel 206. As discussed in more detail below, any locking pin recesses 504 can receive locking pin 216. Wheel 206 also has a set of winding bar recesses 506 around its circumference, all at a common lateral distance from the end of wheel 206 and offset from locking pin recesses 504. As discussed in more detail below, any winding bar recesses 506 can receive winding bar 218. Wheel 206 as shown in the drawings is symmetrical, with six locking pin recesses 504 and six winding bar recesses 506. However, the invention is not so limited, and wheel 206 may have any number of holes in either set, or more or less than two sets.

Referring now to FIG. 7, wheel 206 is shown as mounted on support plate 204, and in this state wheel 206 is freely rotatable about axle 402. Flanges 404, 406 and 408 act as guards to retain wheel 206 in place, and extend past the set of locking pin recesses 504 but not as far as the set of winding bar recesses 506. The locking pin hole 410 is aligned with locking pin recess 504 such that as wheel 206 rotates the locking pin recess 504 rotates below locking pin hole 410. When in proper rotational alignment the locking pin hole 410 of flange 404 aligns directly over a particular locking pin recesses 504 of wheel 206. Locking pin 216 can be inserted into locking pin hole 410 and the below aligned locking pin recess 504, thus locking wheel 206 in place as shown in FIG. 7.

Referring now back to FIG. 3, the left end of shaft 1004 of torsion spring 1000 has a non-circular head (e.g., square) that engages with recess 508 of wheel 206. The other end of shaft 1004 may engage with an optional gear 214, an optional motor 215, and/or an optional additional spring in a manner as known in the art, and is not described further herein.

For installation of shutter assembly 100, support plate 204 is mounted on end cap 106, wheel 206 is mounted on support plate 204, torsion spring 1000 is mounted on wheel 206, and the reel tube 102 is mounted over torsion spring 1000 and connected as appropriate. Since wheel 206 is not yet locked to support plate 204, coil spring 1002 assumes its natural rest length. If not locked in place, when the shutter curtain 1012 is deployed or retracted the coil spring 1002 and wheel 206 would freely rotate, for which torsion spring 1000 will not provide any assistance with winding or unwinding. This changes when locking pin 216 is inserted through locking pin hole 410 and into one of the aligned locking pin recesses 504, such that wheel 206 and shaft 1004 of torsion spring 1000 become locked. Any tension in torsion spring 1000 becomes locked in as coil spring 1002 is not free to release its tension. The torsion spring 1000 will wind and unwind with the shutter curtain and provide assistance with its movement.

At some point the torsion spring 1000 may need to be adjusted. This could be during installation to establish the proper alignment of a locking pin hole 410 with a particular locking pin recess 504 to receive the locking pin 216 and/or to set the spring force to a desired tension different from the rest state. It could also be post-installation to adjust spring tension to a different level.

Figure 8:
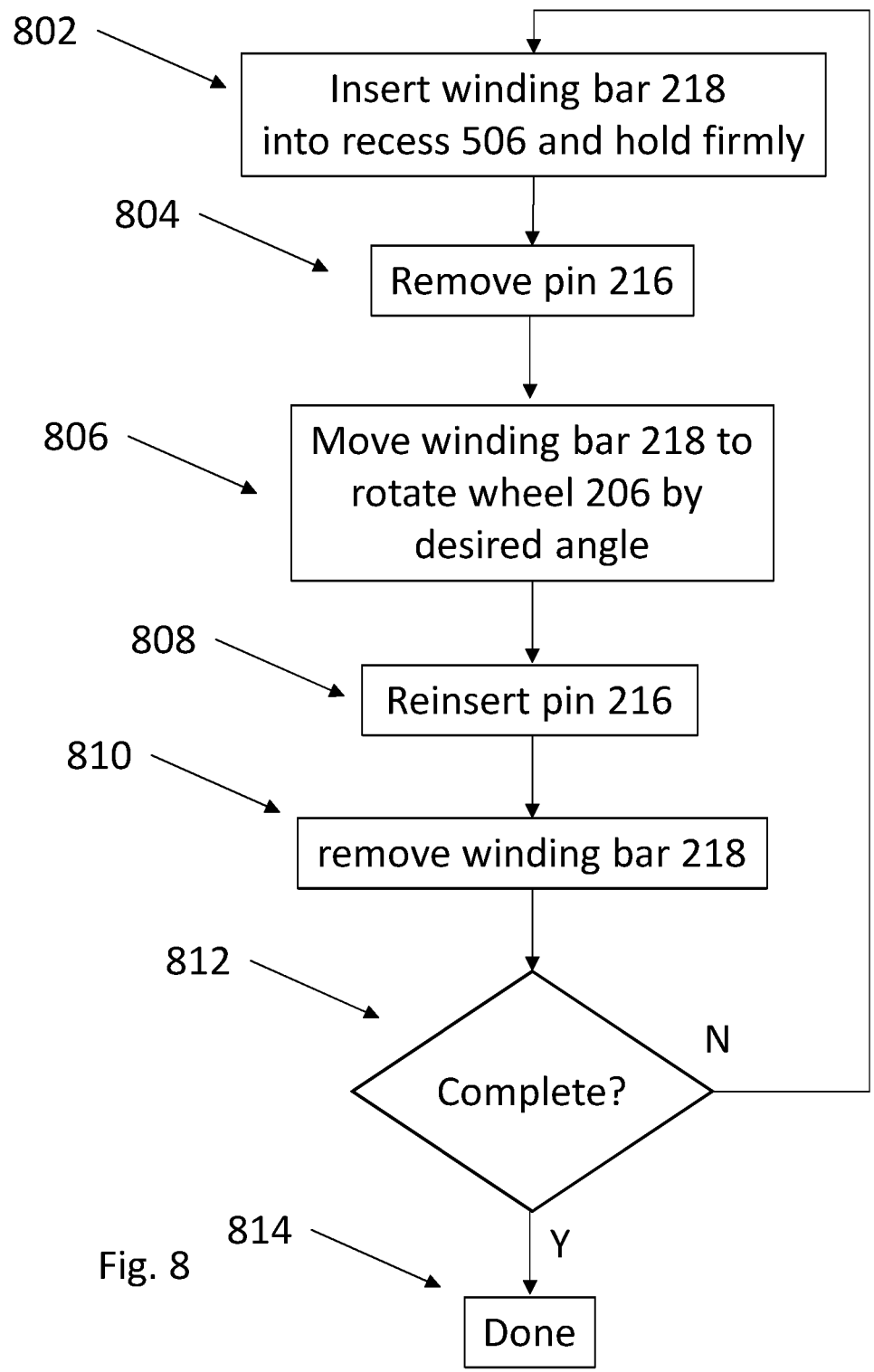
FIG. 8 is a flowchart for adjusting tension in a torsion spring.
Figure 9A:
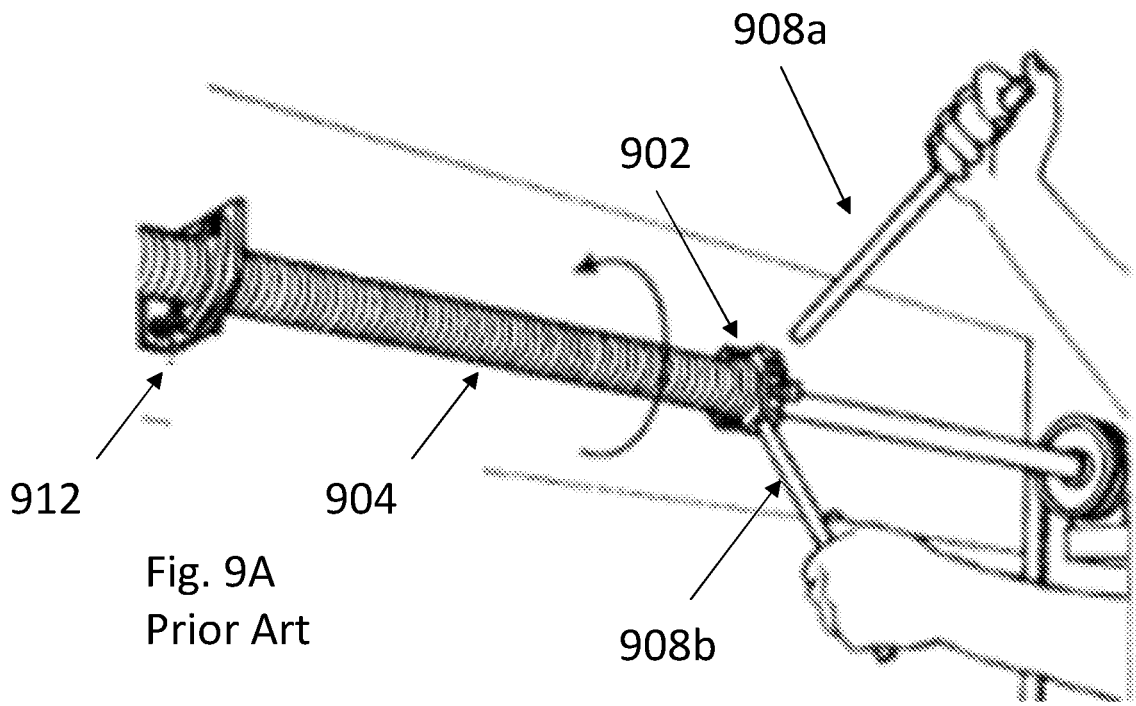
Figure 9B:
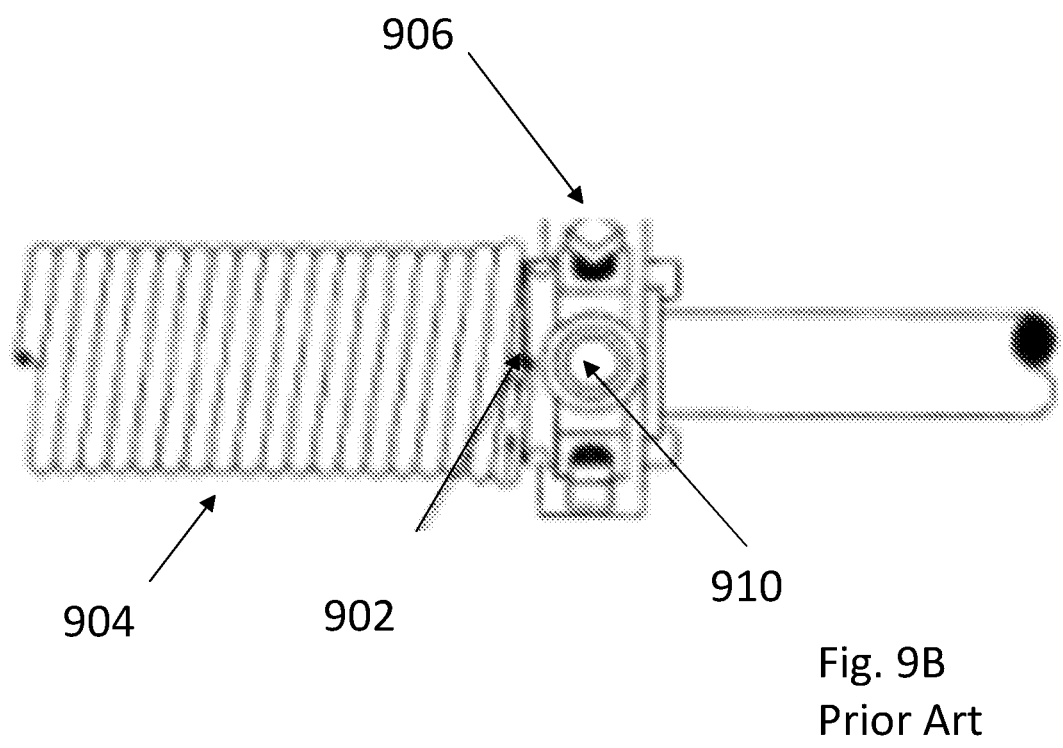

Referring now to FIG. 8, a method for adjusting the tension of torsion spring is shown. At step 802, winding bar 218 is inserted into one of the winding bar recesses 506. The distribution of winding bar recesses 506 around the periphery provides several different points of engagement with winding bar 218, although as a practical matter only some of the winding bar recesses 506 may be reachable given the presence of other components. Since flanges 404, 406 and 408 do not extend as far as winding bar recesses 506, they will not interfere with movement of winding bar 218. If clockwise rotation is needed, then preferably winding bar 218 is inserted into one of the higher facing winding bar recesses 506, such as shown in FIG. 3. If counterclockwise rotation is needed, then preferably winding bar 218 is inserted into one of the lower forward facing winding bar recesses 506. However, the invention is not limited to which winding bar recess 506 is selected.

At step 804, while holding winding bar 218 in place, locking pin 216 is removed from engagement with locking pin recess 504, which unlocks wheel 206 and allows it to rotate. The user maintains their grip on winding bar 218 to prevent coil spring 1002 from unwinding; if the user loses their grip the winding bar 218 will stop rotating coil spring 1002 when the winding bar 218 contacts an obstruction.

At step 806, the user moves the winding bar 218 to rotate the wheel 206 clockwise or counterclockwise as may be desired to tighten or loosen torsion spring 1000. By way of example, in FIG. 3 downward movement of winding bar 218 would rotate the wheel 206 counterclockwise. As wheel 206 rotates, its engagement with the shaft 1004 of torsion spring 1000 rotates shaft 1004, and such rotation of the internal shaft winds or unwinds coil spring 1002 in the manner discussed above with respect to FIG. 10.

As wheel 206 rotates, each successive locking pin recess 504 rotates beneath and into alignment with locking pin hole 410. Step 806 ends by bringing the desired locking pin recess 504 into alignment with locking pin hole 410; this may be the full extent of the desired rotation, or simply as far as winding bar 218 could move without encountering obstructions. At step 808, locking pin 216 is inserted into locking pin hole 410 and whichever of locking pin recesses 504 is in rotational alignment with locking pin hole 410; this locks wheel 206 in place and prevents the coil spring 1002 from returning to its rest state. At step 810 the winding bar is removed.

Based on physical obstacles from other components the winding tool can only rotate so far—typically less than a full rotation. Reaching the desired tension on torsion spring 1000 may take several revolutions, and thus several iterations of the above methodology. Thus if at step 812 further rotation is needed after step 810, then at step 812 the user can return to step 802 and proceed as many times as needed until the desired tension is reached. Otherwise the process completes at step 814.

In the above embodiments, three flanges 404, 406 and 408 are shown. However, the invention is not so limited, and other number of flanges may be used, and in different placements. By way of non-limiting example, the flange could be a unitary complete or partial ring around wheel 206.

In the above embodiments, flange 404 with locking pin hole 410 is directly above wheel 206. This allows gravity to assist in maintaining locking pin 216 in place. However, the invention is not so limited, and other positions of flange 404, as well as flanges 406 and 408, may be used. Flanges 406 and 408 may also be provided with holes to insert locking pin 216. Locking pin 216 may be provided with locking components such as spring loaded or a depressible numb to hold them in position.

Locking pin recesses 504 and winding bar recess 506 may have the same dimensions. In the alternative, they may have different dimensions.

In the above embodiments, wheel 206 is shown with lateral grooves between adjacent locking pin recesses 504. This is an economical design in that it omits material that may not be necessary. However, the invention is not so limited, and other shapes of wheel 206 may be used. A non-limiting example of such a shape is a cylinder.

In the above embodiment, recesses 502 and/or 508 only extend as deep as needed to accommodate axle 402 and/or shaft 1004 of torsion spring 1000. However, the invention is not so limited, and the recesses may extend deeper, and may form a hole that goes through the entire wheel 206.

Locking pin recesses 504 and/or winding bar recesses 506 preferably have bottoms to limit the depth into which locking pin 216 and/or winding bar 218 may extend. However, the invention is not so limited, and some or all of the recesses may be holes that extend all the way through wheel 206.

The specification and drawings are to be regarded in an illustrative rather than a restrictive sense. It will, however, be evident that various modifications and changes may be made thereunto without departing from the broader spirit and scope of the invention as set forth in the claims.

What is claimed is:

1. A rolling shutter system, comprising:
   a torsion spring assembly;
   a support plate having a first flange with a hole, the support plate having a first central axis and the first flange being substantially parallel with said first central axis, a central axis of the hole being perpendicular to the central axis of the flange, and a cylindrical axle coaxial with the central axis of the support plate and projecting from the support plate;
   a wheel rotatably mounted on the support plate, the wheel being unattached to the torsion spring assembly, the wheel having:
      a first end with a cylindrical recess for receiving the cylindrical axle for some but not all of the depth of the wheel;
      a second end with a drive recess coaxial with the cylindrical recess, the drive recess having a non-circular shape configured to mate with a non-circular end of the torsion spring assembly, such that rotation of the wheel causes the drive recess to directly apply pressure to the non-circular end of the torsion spring assembly to rotate the torsion spring assembly;
      a first set of recesses having openings disposed around a circumference of the wheel, the first set of recesses being a first lateral distance from the first end of the wheel, each of the first set of recesses having a central axis that is parallel with a radial axis of the wheel;
      a second set of recesses having openings disposed around the circumference of the wheel, the second set of recesses being a second lateral distance from the first end of the wheel and located between the first set of recesses and the second end of the wheel;
   a reel tube with a hollow interior;
   a plurality of interconnected slats collectively forming a curtain with one end coupled to the reel tube;
   the torsion spring assembly at least partially inserted into the hollow interior of the reel tube, and having a first end mounted in the drive recess of the wheel;
   wherein the first lateral distance aligns the first set of recesses with the hole of the support plate; and
   wherein the second lateral distance aligns the second set of recesses past the support plate.

2. The rolling shutter system of claim 1, further comprising:
   a pin;
   wherein the rolling shutter system has:
      a locked state in which the pin is positioned perpendicularly to the central axis of the first flange through the hole of the first flange and into a recess of the first set of recesses of the wheel such that the wheel cannot rotate relative to the support plate;

an unlocked state where no component is directly inserted into the hole of the first flange and the recess of the first set of recesses, such that the wheel can rotate relative to the support plate.

3. The rolling shutter system of claim 1, wherein the second set of recesses are shaped to receive a winding bar.

4. The rolling shutter system of claim 1, wherein the wheel is rotatable by insertion of a winding bar into a recess of the second set of recesses and moving the winding bar about an axis of the wheel.

5. The rolling shutter system of claim 1, further comprising:

wherein the first end of the torsion spring assembly is held in place by the reel tube, and rotation of the wheel rotates a second end of the torsion spring assembly to adjust a tension of the torsion spring assembly.

* * * * *